(12) United States Patent
Wakuda et al.

(10) Patent No.: US 9,558,054 B2
(45) Date of Patent: Jan. 31, 2017

(54) APPARATUS AND METHOD FOR DETECTING ERRORS ON A TRANSMISSION PATH

(71) Applicant: FUJITSU LIMITED, Kawasaki-shi, Kanagawa (JP)

(72) Inventors: Rinko Wakuda, Kawasaki (JP); Hiroyuki Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 309 days.

(21) Appl. No.: 14/220,566

(22) Filed: Mar. 20, 2014

(65) Prior Publication Data

US 2014/0331109 A1 Nov. 6, 2014

(30) Foreign Application Priority Data

May 1, 2013 (JP) .................. 2013-096636

(51) Int. Cl.
G06F 11/07 (2006.01)
G06F 11/00 (2006.01)
H04L 1/00 (2006.01)
H04L 1/24 (2006.01)

(52) U.S. Cl.
CPC ......... G06F 11/076 (2013.01); G06F 11/0706 (2013.01); H04L 1/0045 (2013.01); H04L 1/24 (2013.01)

(58) Field of Classification Search
None
See application file for complete search history.

(56) References Cited

U.S. PATENT DOCUMENTS

| 5,764,651 | A | * | 6/1998 | Bullock | H04J 3/14 714/704 |
| 5,870,666 | A | * | 2/1999 | Tanaka | H04B 17/318 455/226.1 |
| 6,879,628 | B1 | * | 4/2005 | Choi | H04B 17/23 375/224 |
| 2003/0021234 | A1 | * | 1/2003 | Soltysiak | H04J 3/14 370/242 |
| 2008/0222493 | A1 | * | 9/2008 | Fediakine | H04B 10/07953 714/774 |

FOREIGN PATENT DOCUMENTS

| JP | 2000-101550 | 4/2000 |
| JP | 2000-250896 | 9/2000 |

* cited by examiner

Primary Examiner — Justin R Knapp
(74) Attorney, Agent, or Firm — Staas & Halsey LLP

(57) ABSTRACT

An apparatus detects an error from data transmitted on a transmission path, and measures a first value indicating the number of times the number of errors detected within a first time interval becomes equal to or greater than a first threshold. The apparatus reports that a failure has been detected on the transmission path of the data, when the first value measured within a second time interval longer than the first time interval becomes equal to or greater than a second threshold.

10 Claims, 8 Drawing Sheets

FIG. 5

| DATA | ECC |

APPARATUS AND METHOD FOR DETECTING ERRORS ON A TRANSMISSION PATH

CROSS-REFERENCE TO RELATED APPLICATION

This application is based upon and claims the benefit of priority of the prior Japanese Patent Application No. 2013-096636, filed on May 1, 2013, the entire contents of which are incorporated herein by reference.

FIELD

The embodiments discussed herein are related to an apparatus and method for detecting errors on a transmission path.

BACKGROUND

A technology in which data is transmitted between integrated circuits and between information processing devices is known. When the speed at which data is transmitted is raised using such a technology, an error is likely to occur on the transmission path. On the assumption that errors probabilistically occur on the transmission path, a data transmission scheme is designed so as to permit errors that occur with a frequency defined in advance. Then, in the information processing device to which such a transmission scheme is applied, when the frequency at which errors have occurred exceeds a permissible frequency, it is determined that a failure has occurred on the transmission path.

For example, a serializer/deserializer (SerDes) transmission path for performing transmission of date by converting parallel data to serial data is designed such that the bit error rate obtained by dividing the number of bits having errors by the number of bits of transmitted data is equal to or less than $10^{-12}$. An information processing device that transmits data through a SerDes transmission path determines that a failure has occurred on the transmission path, when the bit error rate within a predetermined time interval is equal to or greater than $10^{-12}$. In another example, an information processing device counts the number of errors that have occurred, in each predetermined time interval, and determines that a failure has occurred on the transmission path when the counted number exceeds a predetermined threshold.

Japanese Laid-open Patent Publication No. 2000-101550 and Japanese Laid-open Patent Publication No. 2000-250896 disclose related art techniques.

SUMMARY

According to an aspect of the invention, an apparatus detects an error from data transmitted on a transmission path, and measures a first value indicating the number of times the number of errors detected within a first time interval becomes equal to or greater than a first threshold. The apparatus reports that a failure has been detected on the transmission path of the data, when the first value measured within a second time interval longer than the first time interval becomes equal to or greater than a second threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of data used by an error checker, according to an embodiment;

DESCRIPTION OF EMBODIMENTS

In the aforementioned technique for monitoring the bit error rate within a predetermined time interval and technique for monitoring whether the number of errors that have occurred is equal to or greater than a predetermined threshold, a failure is determined using one time interval or one threshold. Therefore, there is a problem in that errors that probabilistically occur are not appropriately detected.

Hereinafter, description will be given of an information processing device that transmits data through a SerDes transmission path designed so that the bit error rate is equal to or greater than $10^{-12}$. For example, when monitoring a bit error rate within a time interval during which $10^{15}$-bit data is transferred, the information processing device does not report an error even if 999 errors have continuously occurred, but reports an error at the time at which the thousandth error has occurred. However, in the case of a time interval during which $10^{13}$-bit data is transferred, the bit error rate obtained when 999 errors have occurred is about $10^{-10}$, and thus it is considered that the ability to detect errors is insufficient.

Also, for example, when monitoring whether the number of errors that have occurred is equal to or greater than ten in each time interval during which $10^{13}$-bit data is sent, the information processing device determines that a failure has occurred, at the time when ten burst errors have occurred, without depending on the number of bits that have been successfully transmitted. For this reason, the information processing device overreacts to a momentary burst error in some cases.

Hereinafter embodiments of an information processing device and a method for controlling an information processing device according to the present application will be described in detail with reference the accompanying drawings. It is to be noted that the technique disclosed herein is not limited to the embodiments. Also, to the extent not inconsistent herewith, embodiments may be appropriately combined.

First Embodiment

Figure 1:
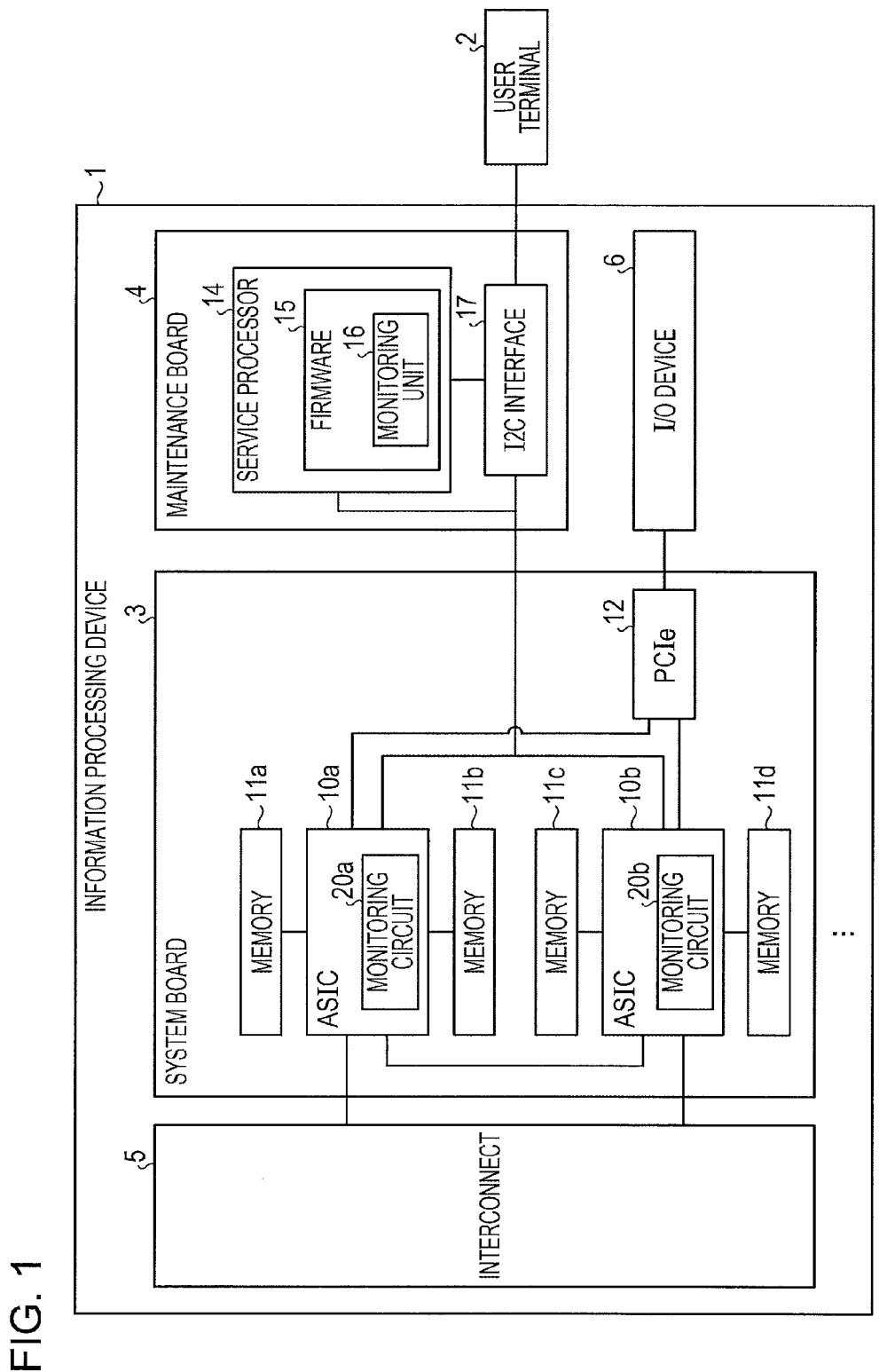
FIG. 1 is a block diagram illustrating an information processing device, according to a first embodiment.

In a first embodiment described below, the information processing device according to embodiments will be described with reference to FIG. 1. FIG. 1 is a block diagram illustrating an information processing device according to a first embodiment. As illustrated in FIG. 1, an information processing device 1 is connected to a user terminal 2 via a maintenance bus having a function of an inter-integrated circuit (I2C) bridge. The information processing device 1 includes a system board 3, a maintenance board 4, an interconnect 5, and an input/output (I/O) device 6. Note that the information processing device 1 may include a plurality of system boards similar to the system board 3, which are not illustrated in FIG. 1, and may connect the system boards via the interconnect 5.

The system board 3 includes a plurality of application specific integrated circuits (ASICs) 10a and 10b, memories 11a and 11b connected to the ASIC 10a, and memories 11c and 11d connected to the ASIC 10b. The system board 3 also includes a peripheral component interconnect express (PCIe) 12. The ASICs 10a and 10b include monitoring circuits 20a and 20b, respectively.

Note that the system board 3 may include any computing processing units, such as central processing units (CPUs), instead of the ASICs 10a and 10b. Although an example in which the system board 3 includes two ASICs 10a and 10b is illustrated in FIG. 1, the embodiments are not limited to this, and the system board 3 may include any number of ASICs.

The maintenance board 4 includes a service processor 14 and an I2C interface 17. The service processor 14 includes a circuit that operates as a monitoring unit 16 by executing firmware 15.

The functional configuration that the information processing device 1 illustrated in FIG. 1 has is now described. Note that, hereinafter, assuming that the ASIC 10b performs the same function as the ASIC 10a, description of the ASIC 10b is omitted. Assuming that the memories 11b to 11d each perform the same function as the memory 11a, description of the memories 11b to 11d is omitted.

The interconnect 5 relays data communications between the ASICs 10a and 10b included in the information processing device 1. For example, the interconnect 5 is a serial transmission path along which data is sent and received one bit at a time. The I/O device 6 is an I/O device, such as a hard disk drive (HDD), connected via the PCIe 12 to the system board 3.

The ASIC 10a is a processing unit that acquires data stored in each of the memories 11a to 11d using, for example, cache coherent non-uniform memory access (ccNUMA) technology, and performs various computing operations using the acquired data. For example, the ASIC 10a acquires, via the interconnect 5, data stored in the memory 11d connected to the ASIC 10b, and performs a computing operation using the acquired data. Note that the memory 11a is a memory device connected to the ASIC 10a. The PCIe 12 is a serial bus connecting each of the ASICs 10a and 10b to the I/O device 6.

The service processor 14 is a processing unit for controlling the system board 3 and other system boards, which are not illustrated in the drawing, included in the information processing device 1. For example, the service processor 14 executes the firmware 15 for managing various types of hardware that the information processing device 1 has, thereby performing various types of control.

Then, when the service processor 14 detects a failure in the ASIC 10a, for example, via the maintenance bus, the service processor 14 notifies, through the I2C interface 17, the user terminal 2 that the ASIC 10a has failed. Note that the service processor 14 may have, for example, a function to separate an ASIC, a memory, the system board 3, and so on, in which a failure has occurred, from the system of the information processing device 1.

The I2C interface 17 controls, via the maintenance bus, communication between the user terminal 2 and the service processor 14. For example, upon receipt of setting information for the ASICs 10a and 10b from the user terminal 2, the I2C interface 17 writes the setting information to setting registers included in the ASICs 10a and 10b, via the maintenance bus. For example, upon receiving, from the service processor 14, a report to the effect that the ASIC 10a has failed, the I2C interface 17 outputs the received report to the user terminal 2.

Here, the information processing device 1 performs data communication between the ASICs 10a and 10b through the interconnect 5, which is a serial transmission path. However, in the case where data transmission is performed through a serial transmission path, an error such as a bit error may occur in data to be sent and to be received because of disturbance and so on. For this reason, the ASIC 10a transfers data such that errors at a frequency defined in advance are permitted.

For example, the ASIC 10a sends and receives data to which an error detection and correction (ECC) bit, which may correct an error at a frequency defined in advance, is appended. Then, when the ASIC 10a detects an error from the received data, the ASIC 10a performs error correction by using the ECC bit appended to the data.

Here, the information processing device 1 determines that a failure has occurred on a data transmission path, when the frequency with which an error occurs is higher than a predetermined threshold. However, since errors probabilistically occur on the data transmission path, if the information processing device 1 uses one threshold in order to make a determination as to whether a failure has occurred, the determination is not appropriate in some cases.

Figure 2:
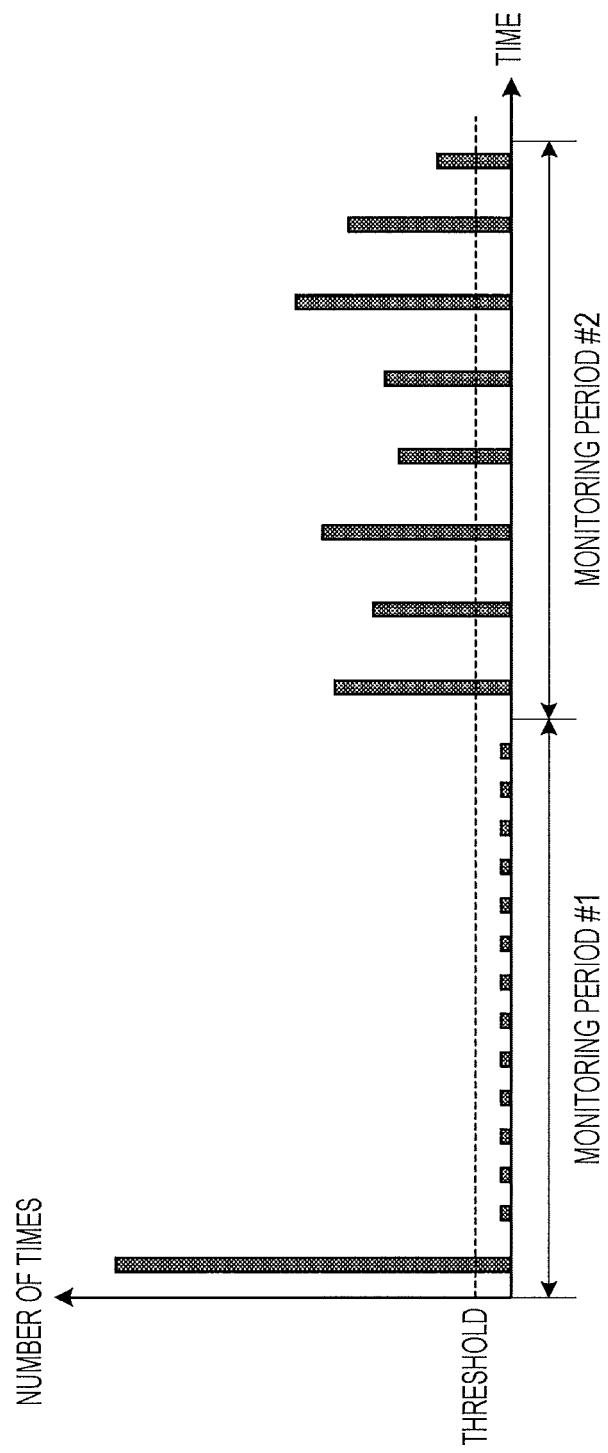
FIG. 2 a diagram illustrating an example of a difference between detected errors.

For example, FIG. 2 illustrates a difference between detected errors. Note that, in FIG. 2, the number of times an error has occurred is plotted on a vertical axis and time is plotted on a horizontal axis. Also, in FIG. 2, the number of times an error has occurred is plotted for a monitoring period #1 in which a burst error, in which errors successively occur, occurs first, and then not many errors occur, and for a monitoring period #2 during which errors continue to occur.

For example, a conventional information processing device counts the number of detected errors in a predetermined time interval, and determines that a failure has occurred on the transmission path of data when the number of counted errors is equal to or greater than a predetermined threshold. However, in the case where a burst error occurs and the number of errors exceeds the threshold as in the monitoring period #1, such a conventional information processing device determines that a fault has occurred in the transmission path although a fault has not occurred in the transmission path. That is, the conventional information processing device overreacts to a burst error.

The conventional information processing device, meanwhile, determines that a failure has occurred on the transmission path when the bit error rate within a predetermined time interval is equal to or greater than a threshold. However, if the time interval or threshold is not suitably set, such a conventional information processing device may determine occurrence of a fault in the transmission path when errors continue to be detected as in the monitoring period #1.

Figure 3:
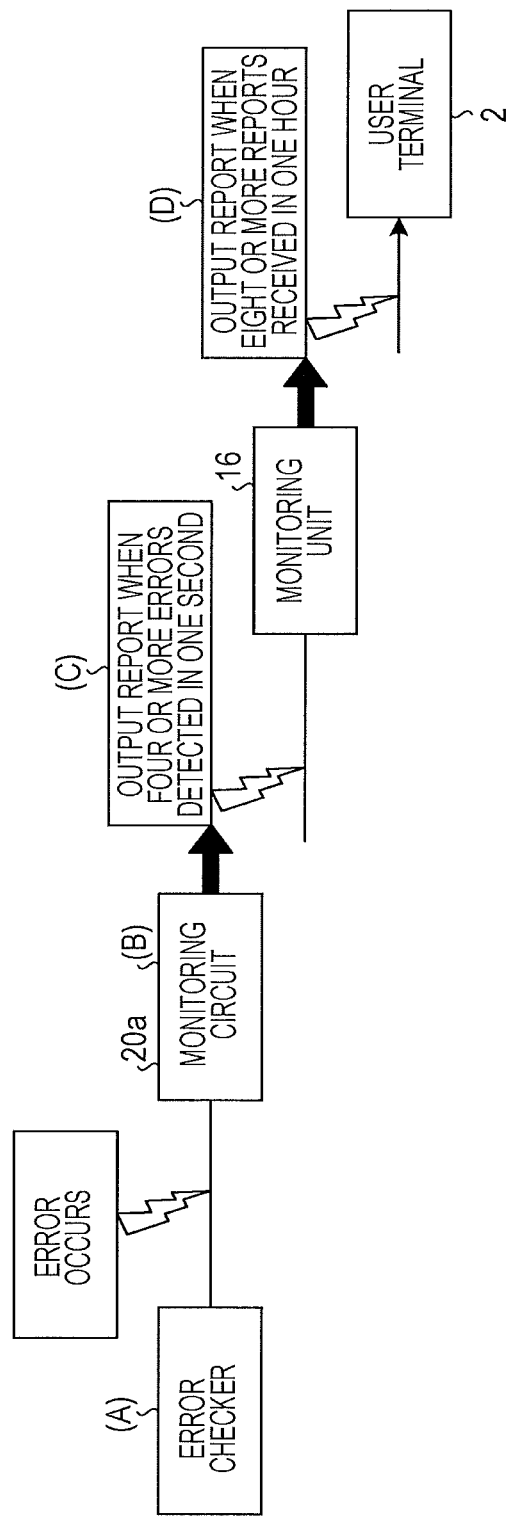
FIG. 3 is a diagram illustrating an example of a method for detecting errors, according to an embodiment.

Also, if the time interval or threshold is not suitably set, such a conventional information processing device may not determine occurrence of a fault in the transmission path even if a fault has occurred in the transmission path and errors continue to occur as in the monitoring period #2. To address these issues, the information processing device 1 determines a fault of the transmission path by combining a plurality of thresholds. With reference to FIG. 3, a method for detecting an error performed by the information processing device 1 will be described below.

FIG. 3 is a diagram illustrating an example of a method for detecting an error performed by an information processing device. First, as illustrated at (A) of FIG. 3, the ASIC 10*a* detects an error from data transmitted and received through the interconnect 5 by using an error checker. As illustrated at (B) of FIG. 3, the monitoring circuit 20*a* included in the ASIC 10*a* counts the number of times the error checker detects an error. Then, when the number of errors detected by the error checker within a first time interval becomes equal to or greater than a first threshold, the monitoring circuit 20*a* outputs a report to the effect that an error has occurred to the service processor 14.

For example, when the error checker detects four or more errors in one second as illustrated at (C) of FIG. 3, the monitoring circuit 20*a* outputs a report to the effect that an error has occurred to the service processor 14. By performing such processing, the monitoring circuit 20*a* performs error detection based on a bit error rate.

Meanwhile, the monitoring unit 16 of the firmware 15 executed by the service processor 14 counts the number of times a report to the effect that an error has occurred is received. Then, when the value counted within a second time interval longer than the first time interval is equal to or greater than a predetermined threshold, the monitoring unit 16 notifies the user terminal 2 that a fault has occurred in the transmission path.

For example, when a report is received eight or more times in 1 hour as illustrated at (D) of FIG. 3, the monitoring unit 16 outputs a report to the effect that a fault has occurred in the transmission path to the user terminal 2. That is, the monitoring unit 16 determines whether a fault of the transmission path has occurred, in accordance with the number of times an error exceeding a permissible bit error rate is detected, within a period of time sufficient for determining a fault of the transmission path.

In this way, the information processing device 1 counts the number of times the number of errors that have occurred within the first time interval becomes equal to or greater than the first threshold. Then, when the number of times counted within the second time interval longer than the first time interval becomes greater than the second threshold, the information processing device 1 reports to the user terminal 2 that a fault has occurred in the transmission path. Therefore, the information processing device 1 may appropriately detect errors that probabilistically occur.

For example, when disturbance has occurred and a burst error has occurred, the monitoring circuit 20*a* reports to the monitoring unit 16 that an error has occurred; however, when the disturbance is removed and a burst error does not occur, the monitoring circuit 20*a* does not report to the monitoring unit 16 that an error has occurred. In such a case, the monitoring unit 16 does not report a fault to the user terminal 2. Thus, the information processing device 1 does not overreact to a burst error.

Also, when a fault has occurred in the transmission path and errors steadily continue to occur, the monitoring circuit 20*a* continues to report to the monitoring unit 16 that an error has occurred. In such a case, the monitoring unit 16 will report the fault to the user terminal 2. Therefore, the information processing device 1 may appropriately detect a fault of the transmission path.

Figure 4:
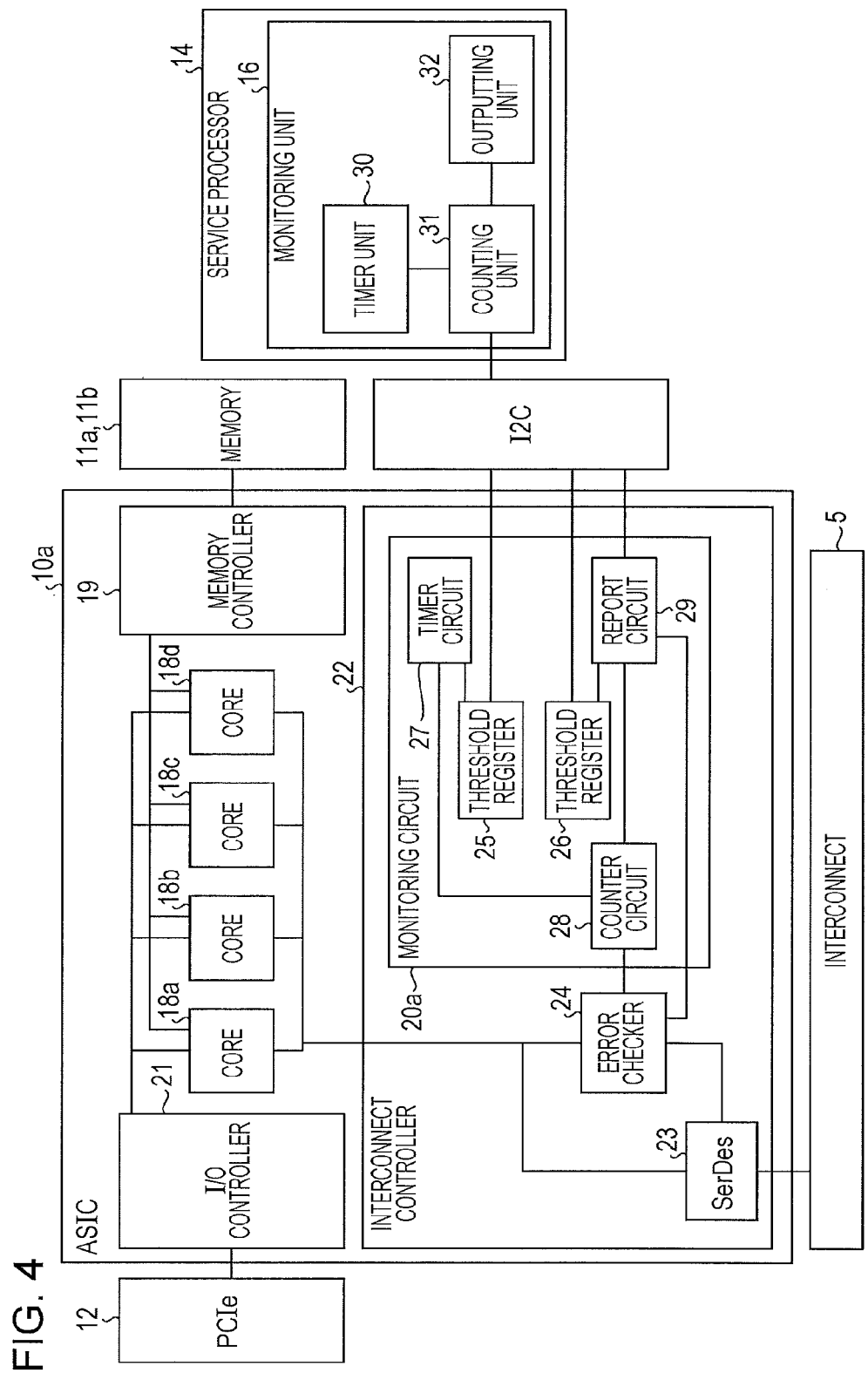
FIG. 4 is a diagram illustrating an example of a functional configuration of a monitoring circuit and a monitoring unit, according to an embodiment.

Next, with reference to FIG. 4, functional configurations of the monitoring circuit 20*a* and the monitoring unit 16 will be described. FIG. 4 is a block diagram illustrating an example of functional configurations of a monitoring circuit and a monitoring unit, according to a first embodiment. For example, the ASIC 10*a* includes a plurality of cores 18*a* to 18*d*, a memory controller 19, an I/O controller 21, and an interconnect controller 22.

The interconnect controller 22 includes the monitoring circuit 20*a*, a SerDes 23, and an error checker 24. The monitoring circuit 20*a* includes a threshold register 25, a threshold register 26, a timer circuit 27, a counter circuit 28, and a report circuit 29. The monitoring unit 16 of the service processor 14 includes a timer unit 30, a counting unit 31, and an outputting unit 32. Note that, hereinafter, assuming that the cores 18*b* to 18*d* each perform the same function as the core 18*a*, description of the cores 18*b* to 18*d* is omitted.

Note that, the example illustrated in FIG. 4 demonstrates that the service processor 14 includes the monitoring unit 16 corresponding to the monitoring circuit 20*a*. However, the service processor 14 further includes a monitoring unit that performs the same function as the monitoring unit 16 and that corresponds to the monitoring circuit 20*b* included in the other ASIC 10*b*. That is, the service processor 14 includes a plurality of monitoring units that correspond in a one-to-one fashion to ASICs, which are controlled by the service processor 14.

The core 18*a* is a processing unit that performs various computing operations. For example, the core 18*a* issues a request for reading data, to the memory controller 19, and performs a computing operation using the data read from the memories 11*a* and 11*b*. Also, for example, the core 18*a* issues a request for reading data stored in the I/O device 6, to the I/O controller 21, and performs a computing operation using the data read from the I/O device 6.

The memory controller 19 controls access to the memories 11*a* and 11*b*. For example, in response to the request from the core 18*a*, the memory controller 19 writes and reads data stored in the memories 11*a* and 11*b*. Note that, upon receipt of a request for reading data that is not stored in the memories 11*a* and 11*b*, the memory controller 19 transfers the request to the I/O controller 21 so as to request data stored in the I/O device 6 to be read. Thereafter, the memory controller 19 stores the read data in the memories 11*a* and 11*b*, and outputs the read data to a core that has issued the request, for example, the core 18*a*.

The I/O controller 21 controls sending and receiving of data between the I/O device 6 connected thereto through the PCIe 12 and the cores 18*a* to 18*d*. For example, upon receiving, from the core 18*a*, a request for reading data, the I/O controller 21 acquires data from the I/O device 6 via the PCIe 12, and outputs the acquired data to the core 18*a*.

The interconnect controller 22 is a control device that controls transmission of data via the interconnect 5. The SerDes 23 performs conversion between serial data and parallel data. For example, when receiving data sent from the core 18*a*, the SerDes 23 appends ECC for correcting an error in the received data to the data. For example, the SerDes 23 detects a 2-bit error from 64-bit data, and appends 8-bit ECC that may correct a 1-bit error.

Then, the SerDes 23 converts the data with ECC to serial data, and sends the converted data to the interconnect 5. Upon receipt of serial data via the interconnect 5, the SerDes 23 converts the received serial data to parallel data, and output the converted data to the error checker 24.

Note that when the SerDes 23 does not receive data to be sent, from the cores 18a to 18d, the SerDes 23 appends ECC to a predetermined data pattern and continues to send the data pattern. When there is no data to be sent from the other ASIC 10b or the like to the ASIC 10a, the SerDes 23 receives the predetermined data pattern with ECC. Then, the SerDes 23 outputs the received data pattern to the error checker 24.

Figure 5:
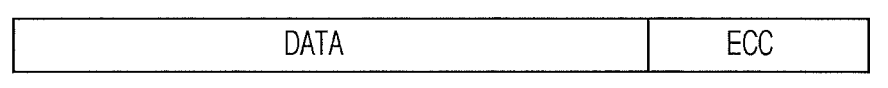

The error checker 24 detects an error from data received from the SerDes 23, and corrects the error. For example, FIG. 5 is a diagram illustrating an example of data used by an error checker. As illustrated in FIG. 5, each time the error checker 24 receives 72-bit data, the error checker 24 acquires 64-bit data and 8-bit ECC from the received data. Then, the error checker 24 detects an error from the data by using ECC.

Here, when the error checker 24 detects a correctable error, the error checker 24 outputs a notification to the effect that the error has been detected to the counter circuit 28. The error checker 24 also attempts to correct an error by using ECC. When the error is corrected, the error checker 24 outputs the corrected data to a core serving as the sending destination, for example, the core 18a. When the error checker 24 does not detect an error, the error checker 24 directly outputs the data to a core serving as the sending destination.

In contrast, when the error checker 24 fails to correct an error, the error checker 24 discards the data, and notifies a core serving as the sending destination that data has not been normally received. Also, when the error checker 24 fails to correct an error, the error checker 24 notifies the report circuit 29 that an uncorrectable error has been detected.

Note that the error checker 24 operates with a period in accordance with the operating clock of the ASIC 10a and the shortest time interval at which errors are considered to successively occur. For example, in a case where the operating clock of the ASIC 10a is 2 GHz, and the shortest time interval at which errors successively occur is 1 ns, the error checker 24 operates in units of 0.5 ns so as to perform error detection and so forth.

Also, when the received data is a data pattern with ECC, the error checker 24 detects an error and performs correction of the error. Then, when the error checker 24 detects a correctable error, the error checker 24 notifies the counter circuit 28 thereof, whereas when the error checker 24 detects an uncorrectable error, the error checker 24 notifies the report circuit 29 thereof. Thereafter, the error checker 24 discards the data pattern.

The threshold register 25 is a register that may be rewritten from the user terminal 2 via the maintenance bus. In particular, a value representing the first time interval is stored in the threshold register 25. Like the threshold register 25, the threshold register 26 is a register that may be rewritten from the user terminal 2 via the maintenance bus and in which the first threshold is stored.

The timer circuit 27 is a circuit that resets a value counted by the counter circuit 28 at the first time interval. For example, the timer circuit 27 performs counting using clock signals of the ASIC 10a, and when the count value reaches the first time interval, the timer circuit 27 resets the value counted by the counter circuit 28 to "0".

For example, the timer circuit 27 includes a counter circuit and a comparison circuit. Here, the counter circuit, in which a plurality of D-type flip-flops are connected in a multi-stage fashion, performs counting at the time when a signal obtained by dividing a clock signal of the ASIC 10a goes high. For example, the counter circuit divides a clock signal of the ASIC 10a to signals with a period of 0.1 s (second), and performs counting at the time when the divided signal goes high.

The comparison circuit compares the value stored in the threshold register 25 with the value counted by the counter circuit, and when the values match, the comparison circuit outputs a signal for resetting the count value to the counter circuit 28. In one example, the comparison circuit is an AND gate that outputs the AND of the value stored in the threshold register 25 and the value counted by the counter circuit, to the counter circuit 28.

The counter circuit 28 is a counter that counts the number of times the error checker 24 detects an error within the first time interval. For example, upon receiving, from the error checker 24, a signal to the effect that an error has been detected, the counter circuit 28 advances the count value by one. When the first time interval has elapsed, that is, when the counter circuit 28 receives a signal for resetting the count value from the timer circuit 27, the counter circuit 28 restores the count value to "0".

For example, the counter circuit 28 is a counter circuit in which a plurality of D-type flip-flops are connected in a multi-stage fashion, and performs counting at the time when a signal output from the error checker 24 goes high. Also, the counter circuit 28 resets its count value when a signal received from the timer circuit 27 goes high.

When the number of errors detected within the first time interval is equal to or more than the first threshold, the report circuit 29 notifies via the maintenance bus to the service processor 14 that an error has been detected. For example, the report circuit 29 compares the value stored in the threshold register 26 with the count value of the counter circuit 28, and when the values match, the report circuit 29 notifies via the maintenance bus to the service processor 14 that an error has been detected.

When receiving from the error checker 24 a notification to the effect that an uncorrectable error is detected, the report circuit 29 notifies to the service processor 14 that an error has been detected, without depending on the count value of the counter circuit 28. That is, when an uncorrectable error is detected, the monitoring circuit 20a immediately notifies the service processor 14 that an error has been detected. Note that, by way of example, the report circuit 29 may be implemented by an AND gate to which an output of the threshold register 26 and an output of the counter circuit 28 are input, and an OR gate to which a signal from a signal line, which outputs a signal when the error checker 24 detects an uncorrectable error, and an output of the AND gate are input.

Next, the functional configuration of the monitoring unit 16 included in the service processor 14 is described. The timer unit 30 resets the value counted by the counting unit 31 each time the second time interval has elapsed. For example, the timer unit 30 request the counting unit 31 every one hour to reset a value that has been counted.

The counting unit 31 counts the number of detected errors within the second time interval. For example, upon receiving, via the maintenance bus from the ASIC 10a, a signal to the effect that an error has been detected, the counting unit 31 adds one to a value being counted. When the counting unit 31 is requested by the timer unit 30 to reset a value that has been counted, the counting unit 31 resets the value being counted to "0".

When the value counted within the second time interval becomes equal to or greater than the second threshold, the outputting unit 32 notifies the user terminal 2 that a fault of the transmission path has occurred. For example, the outputting unit 32 compares the value counted by the counting unit 31 with the second threshold at an interval of one second, and when the value counted by the counting unit 31 is equal to or greater than the second threshold, the counting unit 31 notifies the user terminal 2, via the I2C, that a fault of the transmission path has occurred.

Figure 6:
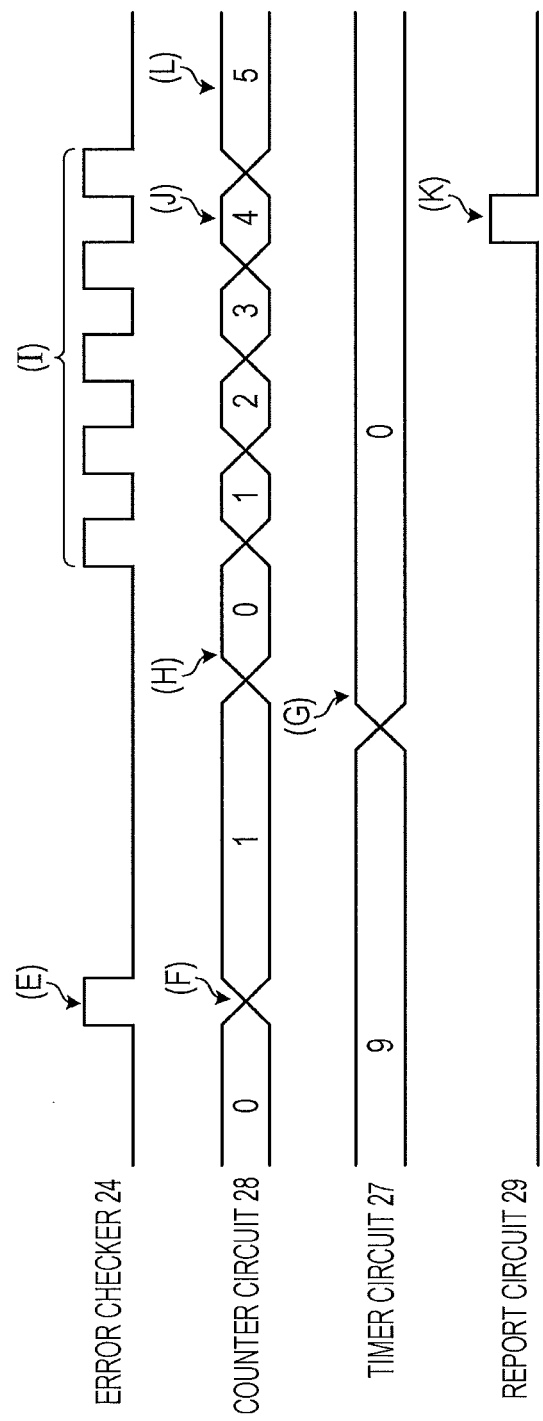
FIG. 6 is a diagram illustrating an example of an operational sequence of a monitoring circuit, according to an embodiment.

Next, with reference to FIG. 6, description will be given of operations performed when the monitoring circuit 20a notifies the service processor 14 that an error has been detected. FIG. 6 is a diagram illustrating an example of a operational sequence for a monitoring circuit, according to a first embodiment. Note that the example illustrated in FIG. 6 demonstrates that the timer circuit 27 performs counting from a value of "0" to a value of "9" every 0.1 s (second), and the value counted by the counter circuit 28 is reset when the count value shifts from "9" to "0".

The example illustrated in FIG. 6 demonstrates that when the count value of the counter circuit 28 is "4", the service processor 14 is notified that an error has been detected. That is, in the example illustrated in FIG. 6, when four or more errors are detected in one second, the monitoring circuit 20a notifies the service processor 14 that an error has been detected.

For example, upon detection of an error when the count value of the timer circuit 27 is "9", the error checker 24 makes the potential of a signal output to the counter circuit 28 high as illustrated at (E) of FIG. 6. Then, the counter circuit 28 increments the count value, from "0" to "1", as illustrated at (F) of FIG. 6.

As illustrated at (G) of FIG. 6, after 0.1 s (second) has elapsed since the count value went "9", the timer circuit 27 updates the count value to "0". As a result, as illustrated at (H) of FIG. 6, the count value of the counter circuit 28 is reset to "0".

Here, as illustrated at (I) of FIG. 6, the error checker 24 detects an error successively five times. In such a case, the counter circuit 28 counts the number of times an error is detected. Then, when the count value of the counter circuit 28 is "4" as illustrated at (3) of FIG. 6, a signal output to the I2C is made high as illustrated at (K) of FIG. 6. As a result, the service processor 14 is notified that an error has been detected.

Note that, as illustrated at (L) of FIG. 6, the counter circuit 28 counts the number of times an error has been detected, and sets the count value to "5". However, in order to inhibit overreaction against a burst error, the report circuit 29 does not output a signal to the effect that an error has been detected. That is, even if errors continue to be detected for one second, the monitoring circuit 20a notifies the service processor 14 only once that an error has been detected.

Figure 7:
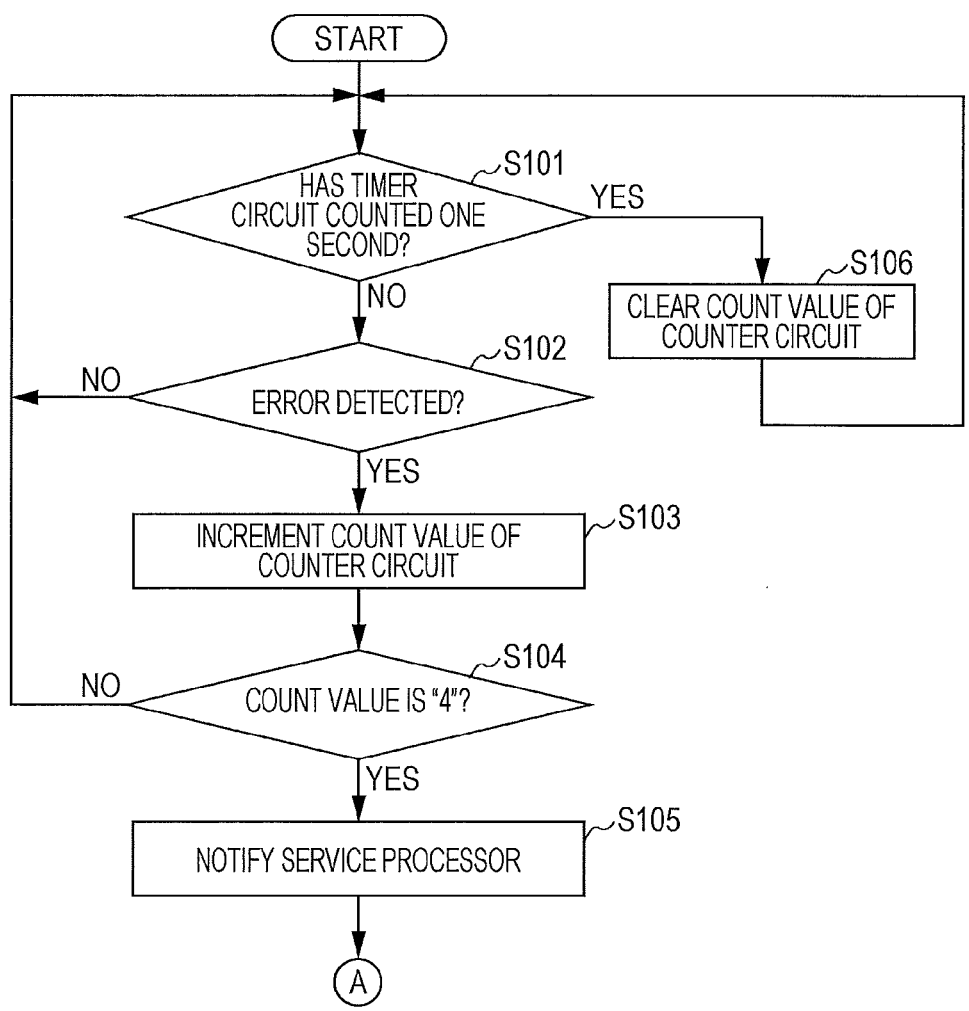
FIG. 7 is a diagram illustrating an example of an operational flowchart for a process performed on an ASIC side, according to an embodiment.

Next, the flow of processes performed by the information processing device 1 will be described with reference to FIG. 7 and FIG. 8. First, with reference to FIG. 7, the flow of a process performed by the monitoring circuit 20a disposed in the ASIC 10a is described. FIG. 7 is a diagram illustrating an example of an operational flowchart for a process performed on an ASIC side, according to an embodiment. Note that the example illustrated in FIG. 7 demonstrates the flow of a process in which when four or more errors are detected in one second, the service processor 14 is notified that errors have been detected.

First, the monitoring circuit 20a determines whether the timer circuit 27 has counted one second (step S101), and when one second has not been counted (No at step S101), the monitoring circuit 20a determines whether an error has been detected (step S102). When an error has been detected (Yes at step S102), the monitoring circuit 20a increments the count value of the counter circuit 28 (step S103).

Next, the monitoring circuit 20a determines whether the count value of the counter circuit 28 is "4" (step S104). Then, when the count value is "4" (Yes at step S104), the monitoring circuit 20a notifies the service processor 14 that an error has been detected (step S105), the process is transferred to step S202 (FIG. 8) at which a notification is received by the service processor 14 (at A of FIG. 7 and at A of FIG. 8), and the process performed by the monitoring circuit 20a ends.

Meanwhile, when the timer circuit 27 has counted one second (Yes at step S101), the monitoring circuit 20a clears the count value of the counter circuit 28 (step S106), and performs the process of step S101 again. Also, when an error has not been detected (No at step S102), the monitoring circuit 20a performs the process of step S101 again. Also, when the count value of the counter circuit 28 is not "4" (No at step S104), the monitoring circuit 20a performs the process of step S101 again.

Figure 8:
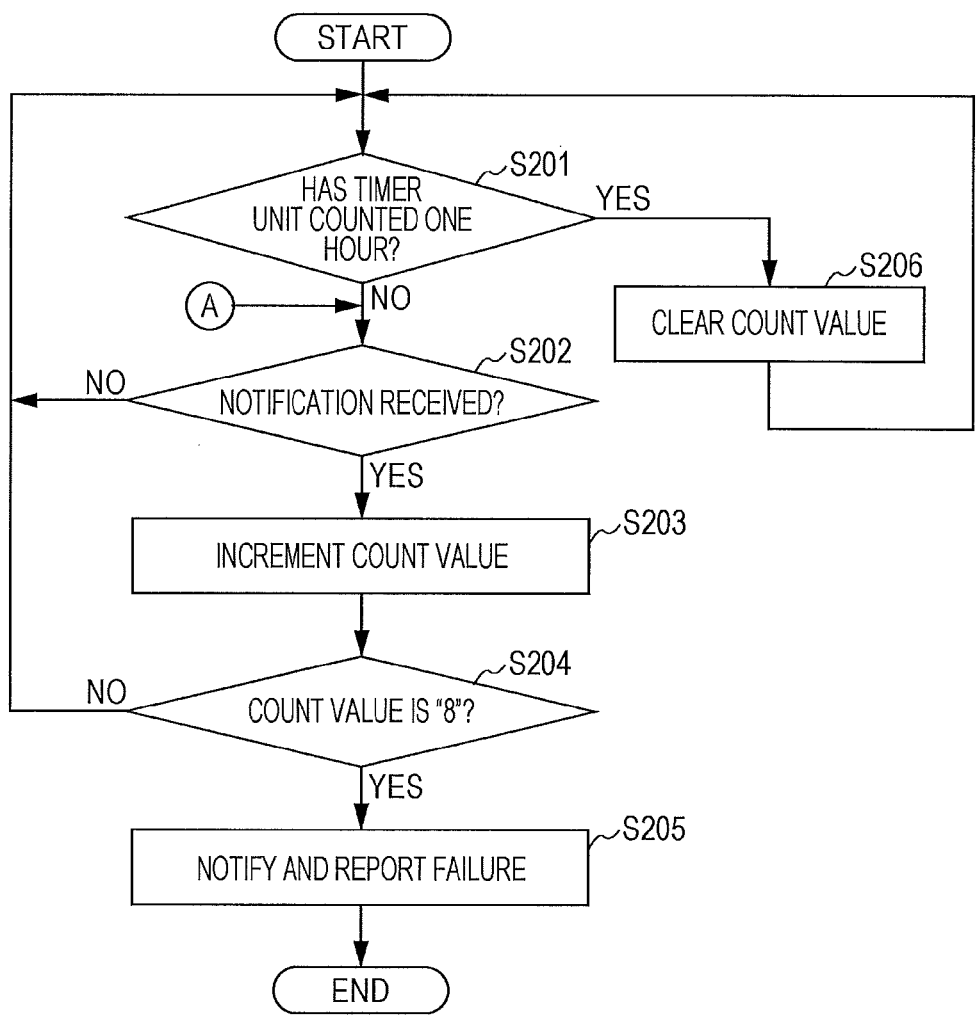
FIG. 8 is a diagram illustrating an example of an operational flowchart for a process performed on a service processor side, according to an embodiment.

Next, with reference to FIG. 8, the flow of a process performed by the service processor 14 is described. FIG. 8 is a diagram illustrating an example of an operational flowchart for a process performed on a service processor side, according to an embodiment. Note that the example illustrated in FIG. 8 demonstrates the flow of a process in which when a notification to the effect that an error has been detected have been received eight or more times in one hour, it is notified that a failure has occurred on the transmission path. Note that, at A of FIG. 8, it is illustrated that the monitoring circuit 20a performs the process illustrated in FIG. 7, and a notification is given.

First, the service processor 14 determines whether the timer unit 30 has counted one hour (step S201), and when the timer unit 30 has not counted one hour (No at step S201), the service processor 14 determines whether a notification to the effect that an error has been detected is received from the monitoring circuit 20a (step S202). When the notification is received (step S105, A of FIG. 7, A of FIG. 8, and Yes at step S202), the service processor 14 increments the count value of the counting unit 31 (step S203).

Next, the service processor 14 determines whether the count value of the counting unit 31 is "8" (step S204). Then, if the count value is "8" (Yes at step S204), the service processor 14 reports to the user terminal 2 that the transmission path has failed (step S205), and the process ends. That is, when an event in which four or more errors are detected within one second has occurred eight or more times within one hour, the service processor 14 reports to the user terminal 2 that the transmission path has failed.

Meanwhile, when the timer unit 30 has counted one hour (Yes at step S201), the service processor 14 clears the count value of the counting unit 31 (step S206) and performs the process of step S201 again. Also, if a notification to the effect that an error has been detected is not received (No at step S202), the service processor 14 performs the process of step S201 again. Also, when the count value of the counting unit 31 is not "8" (No at step S204), the service processor 14 performs the process of step S201 again.

[Advantages of Information Processing Device 1]

As described above, the information processing device 1 includes the error checker 24 that detects an error from data transmitted. The information processing device 1 also includes the monitoring circuit 20a that notifies the service processor 14 that an error has occurred, when the number of errors detected by the error checker 24 within the first time interval becomes equal to or greater than the first threshold. The information processing device 1 also includes the service processor 14 that reports that a failure has been detected on the transmission path, when the number of notifications received within the second time interval longer than the first time interval is equal to or greater than the second threshold.

Therefore, the information processing device 1 may appropriately detect errors that probabilistically occur. For example, by using the monitoring circuit 20a, the information processing device 1 may detect an error in a time interval that is sufficiently short in accordance with the frequency of errors that the transmission path permits. Also, the information processing device 1 determines whether a failure has occurred in a time interval that is sufficiently long for determining that the transmission path has failed. Therefore, the information processing device 1 may inhibit over-reaction, such as a determination that the transmission path has failed when a burst error, which is not a failure of the transmission path, momentarily has occurred because of disturbance and so on.

The monitoring circuit 20a includes the counter circuit 28 that counts the number of detected errors, and the timer circuit 27 that resets the count value of the counter circuit 28 at the first time interval. When the count value of the counter circuit 28 becomes equal to or greater than the first threshold stored in the threshold register 26, the monitoring circuit 20a outputs, to the service processor 14, that an error has occurred. Therefore, the monitoring circuit 20a may easily set an arbitrary value as the first threshold.

The monitoring circuit 20a also includes the threshold register 25 that holds the first time interval. When the count value of the timer circuit 27 matches the value stored in the threshold register 25, the monitoring circuit 20a resets the count value of the counter circuit 28. Therefore, the monitoring circuit 20a may easily set arbitrary time interval as the first time interval.

When an uncorrectable error has been detected, the monitoring circuit 20a notifies the service processor 14 that an error has been detected, without depending on the count value of the counter circuit 28. Therefore, when errors that the transmission path does not permit have occurred successively, the monitoring circuit 20a may report quickly that the transmission path has failed.

Second Embodiment

Although the embodiment has been described hereinbefore, embodiments in various forms other than that of the embodiment described above may be made. Accordingly, hereinafter, other embodiments included in the present disclosure will be described as a second embodiment.

(1) Functional Configuration of Information Processing Device 1

In the example described above, the information processing device 1 includes the monitoring circuit 20a that sends a notification to the service processor 14 when the number of errors detected within the first time interval is greater than the first threshold. The information processing device 1 also includes the monitoring unit 16 that notifies the user interface 2 that a failure has occurred on the transmission path, when the number of notifications received within the second time interval is more than the second threshold. Here, in the first embodiment, the monitoring circuit 20a is implemented by hardware and the monitoring unit 16 is implemented by software.

However, embodiments are not limited to this. For example, functions that the monitoring circuit 20a performs may be implemented by monitoring software executed by the ASIC 10a. For example, the monitoring software may be implemented by the same functional configuration as that of the monitoring unit 16.

Also, functions of the monitoring unit 16 performed by the service processor 14 may be implemented as hardware within the ASIC 10a. In such a case, the monitoring unit 16 is realizable with the same circuit configuration as that of the monitoring circuit 20a. For example, the monitoring unit 16 may be implemented by a counter circuit that counts the number of times the report circuit 29 outputs a signal, a timer circuit that resets the count value of the counter circuit at the second time interval, and a report circuit that provides a report when the count value of the counter circuit becomes equal to or greater than the second threshold.

It is unnecessary to dispose the monitoring circuit 20a and the monitoring unit 16 in physically different devices. For example, a monitoring mechanism that performs the functions of the monitoring circuit 20a and the monitoring unit 16 may be disposed inside the ASIC 10a. Such a monitoring mechanism may detect an error not only from data sent and received through the interconnect 5 but also from data sent and received through an arbitrary transmission path, such as the Internet. Such a monitoring mechanism does not have to be disposed inside a processing unit, and may be disposed, for example, in a communication control device different from the ASIC 10a.

(2) Threshold

The information processing device 1 described above applies "1" second as the first time interval, "4" times as the first threshold, "1" hour as the second time interval, and "8" times as the second threshold. However, embodiments are not limited to this. That is, the information processing device 1 may set arbitrary thresholds in accordance with the frequency of errors that the circuit configuration and the interconnect 5 permit, the frequency with which the error checker 24 detects an error, and so on.

(3) Circuit Configuration

Although an exemplary circuit that implements the monitoring circuit 20a has been described in the first embodiment described above, embodiments are not limited to this, and the monitoring circuit 20a may be implemented by an arbitrary circuit that performs a similar function.

(4) Program

The firmware 15 and a monitoring program that performs a function similar to that of the monitoring circuit 20a are realizable by a program prepared in advance executed by a computer, such as a personal computer or a workstation. The program may be distributed via a network, such as the Internet. The program is recorded on a computer-readable recording medium such as a hard disk, a flexible disk (FD), a compact disc read only memory (CD-ROM), a magneto optical disc (MO), and a digital versatile disc (DVD). The program may also be executed by being read from the recording medium by a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a detection unit configured to detect at least one error from data transmitted on a transmission path;
a measurement unit configured to measure a first value indicating a number of times a number of errors detected by the detection unit within a first time interval becomes equal to or greater than a first threshold; and
a report unit configured to report that a failure has been detected on the transmission path of the data, when the first value measured by the measurement unit within a second time interval longer than the first time interval becomes equal to or greater than a second threshold
wherein the first value is greater than two.

2. The apparatus of claim 1, further comprising:
a first counting unit configured to count a second value indicating the number of errors detected by the detection unit;
a first holding unit configured to hold the first threshold; and
a counting control unit configured to restore the second value counted by the first counting unit to an initial value each time the first time interval has elapsed, wherein
the measurement unit adds one to the first value when the second value counted by the first counting unit and the first threshold held by the first holding unit match.

3. The apparatus of claim 2, further comprising:
a second counting unit configured to count a third value at a predetermined time interval; and
a second holding unit configured to hold a fourth value representing the first time interval, wherein
the measurement control unit restores the second value counted by the first counting unit to the initial value when the third value counted by the second counting unit and the fourth value held by the second counting unit match.

4. The apparatus of claim 1, wherein
the detection unit detects whether a detected error of the detected at least one error is a correctable error or an uncorrectable error from the data, and
the measurement unit adds one to the first value when the detection unit detects the detected error is the uncorrectable error.

5. An apparatus comprising:
a processing device configured to perform a computing operation; and
a control device configured to control the processing device, wherein
the processing device includes:
a detection unit configured to detect at least one error from data transmitted on a transmission path, and
a notification unit configured to notify the control device, when a number of errors detected by the detection unit within a first time interval exceeds a first threshold; and
the control device includes:
a report unit configured to report that a failure has been detected on the transmission path of the data, when a number of notifications from the notification unit exceeds a second threshold within a second time interval longer than the first time interval,
wherein the number of notifications is greater than two.

6. The apparatus of claim 5, wherein
the processing device further includes:
a first counting unit configured to count a first value indicating the number of errors detected by the detection unit,
a first holding unit configured to hold the first threshold, and
a count control unit configured to restore the first value counted by the first counting unit to an initial value each time the first time interval has elapsed; and
the notification unit notifies the control device, when the first value counted by the first counting unit and the first threshold held by the first holding unit match.

7. The apparatus of claim 6, wherein
the processing device further includes
a second counting unit configured to count a second value at a predetermined time interval, and
a second holding unit configured to hold a third value representing the first time interval; and
the count control unit restores the first value counted by the first counting unit to the initial value when the second value counted by the second counting unit and the third value held by the second holding unit match.

8. The apparatus of claim 5, wherein
the detection unit detects whether a detected error of the detected at least one error is a correctable error or an uncorrectable error from the data; and
the notification unit notifies the control device that an error has occurred when the detection unit detects the detected error is the uncorrectable error.

9. A non-transitory, computer-readable recording medium having stored therein a program for controlling an information processing device that sends and receives data, the program causing a computer to execute a process comprising:
detecting at least one error from data transmitted on a transmission path;
counting a first value indicating a number of times a number of detected errors becomes equal to or greater than a first threshold within a first time interval; and
reporting that a failure has been detected on the transmission path of the data, when the first value counted within a second time interval longer than the first time interval becomes equal to or greater than a second threshold,
wherein the first value is greater than two.

10. A method for controlling an information processing device that sends and receives data, the method comprising:
detecting at least one error from data transmitted on a transmission path;
counting a first value indicating a number of times a number of detected errors becomes equal to or greater than a first threshold within a first time interval; and
reporting that a failure has been detected on the transmission path of the data, when the first value counted within a second time interval longer than the first time interval becomes equal to or greater than a second threshold,
wherein the first value is greater than two.

* * * * *